United States Patent [19]

Komatsu

[11] Patent Number: 4,789,199
[45] Date of Patent: Dec. 6, 1988

[54] VEHICLE UNDERBODY STRUCTURE
[75] Inventor: Nobuhiro Komatsu, Hiroshima, Japan
[73] Assignee: Mazda Motor Corporation, Hiroshima, Japan
[21] Appl. No.: 69,180
[22] Filed: Jul. 2, 1987
[30] Foreign Application Priority Data
  Jul. 4, 1986 [JP]  Japan .............................. 61-157463
[51] Int. Cl.⁴ ............................................. B62D 21/00
[52] U.S. Cl. ..................................... 296/194; 296/188; B62D/21/00
[58] Field of Search ............... 296/194, 188, 198, 189

[56] References Cited
U.S. PATENT DOCUMENTS
4,466,653  8/1984  Harasaki ........................... 296/194
4,557,519  12/1985  Matsurura ........................ 296/204
4,673,205  6/1987  Drewek ............................. 296/194

FOREIGN PATENT DOCUMENTS
55-34904  8/1980  Japan.

Primary Examiner—Robert R. Song
Attorney, Agent, or Firm—Gerald J. Ferguson, Jr.

[57] ABSTRACT

A front frame has a closed cross section and is connected to a front wheel apron to extend in the longitudinal direction of the vehicle body. The rear end of the front frame is connected by a torque box to the front end of a side sill which has a closed cross section and extends in the longitudinal direction of the vehicle body along a side edge of a floor panel. A floor frame is connected to the lower surface of the floor panel to extend in the longitudinal direction of the vehicle body on the inner side of the side edge of the floor panel and the front end of the floor frame is connected to an intermediate portion of the torque box.

11 Claims, 3 Drawing Sheets

VEHICLE UNDERBODY STRUCTURE

BACKGROUND OF THE INVENTION

1. Field of the Invention

This invention relates to an underbody structure of a vehicle, and more particularly to a reinforcement structure of a portion on which the rear end portion of a front frame and the front end portion of a side sill converge.

2. Description of the Prior Art

In view of the fact that the vehicle body supports the overall weight of the vehicle and determines the overall shape of the vehicle, the vehicle body must be provided with sufficient strength and rigidity, while on the other hand, from the viewpoint of fuel economy and running performance, it is preferred that the vehicle body be as light as possible. In order to satisfy these conflicting requirements, various vehicle body structures have been proposed. For example, it has been known to increase the rigidity of the vehicle body by providing on the front portion of the vehicle body a front frame having a closed cross section and extending in the longitudinal direction of the vehicle body along a front wheel apron, and providing in an intermediate portion of the vehicle body defining a passenger compartment a side sill extending in the longitudinal direction of the vehicle body along a side edge of a front panel.

However, since the front frame is usually positioned higher than the side sill and on the inner side of the same in order to avoid interference with the front wheel and the like, the front end of the side sill and the rear end of the front frame cannot be directly connected with each other, and accordingly, there arises a problem in the strength of the portion connecting the front end of the side sill and the rear end of the front frame. In order to overcome this problem, there is proposed in Japanese Unexamined Utility Model Publication No. 55(1980)-34904 a vehicle body structure in which the rear end of the front frame is connected to the front end of a floor frame extending in the longitudinal direction of the vehicle body along the lower surface of the floor panel on the inner side of the side edge of the floor panel, and the junction of the front frame and the floor frame is connected to the front end of the side sill by a torque box extending in the transverse direction of the vehicle body. Though being advantageous in that since the front frame, the side sill and the floor frame are connected by the torque box, the body rigidity is enhanced at the junctions of these members, the vehicle body structure gives rise to a problem in deformation of the vehicle body caused by rearward movement of the front frame upon collision against another vehicle. That is, since the front frame is positioned higher than the floor panel, the side sill and the floor frame, a moment which tends to rotate upward the front frame relative to the torque box to which the front ends of the side sill and the floor frame are connected is generated when the front of the vehicle body collides against another vehicle or the like and the front portion of the vehicle body is pushed rearward, thereby rearwardly moving the front frame. This moment rotates upward the front frame about the junction of the front frame and the torque box, thereby causing deformation of the upper portion of the vehicle body, which can cause deformation of the windshield mounting portion.

SUMMARY OF THE INVENTION

In view of the foregoing observations and description, the primary object of the present invention is to provide a vehicle body structure in which the junctions of the front frame, the side sill and the floor frame to the torque box are reinforced and deformation of the vehicle body upon collision can be thereby restrained.

In accordance with the present invention, the rear end of a front frame which has a closed cross section and is connected to a front wheel apron to extend in the longitudinal direction of the vehicle body is connected by a torque box to the front end of a side sill which has a closed cross section and extends in the longitudinal direction of the vehicle body along a side edge of a floor panel. The front end of a floor frame which is connected to the lower surface of the floor panel to extend in the longitudinal direction of the vehicle body on the inner side of the side edge of the floor panel is connected to an intermediate portion of the torque box.

With this arrangement, the torsional rigidity of the torque box is enhanced by the floor frame connected to an intermediate portion thereof, and accordingly, a moment to rotate upward the front frame can be carried by the torque box, whereby upward rotation of the front frame is restrained.

DESCRIPTION OF THE PREFERRED EMBODIMENT

Figure 1:
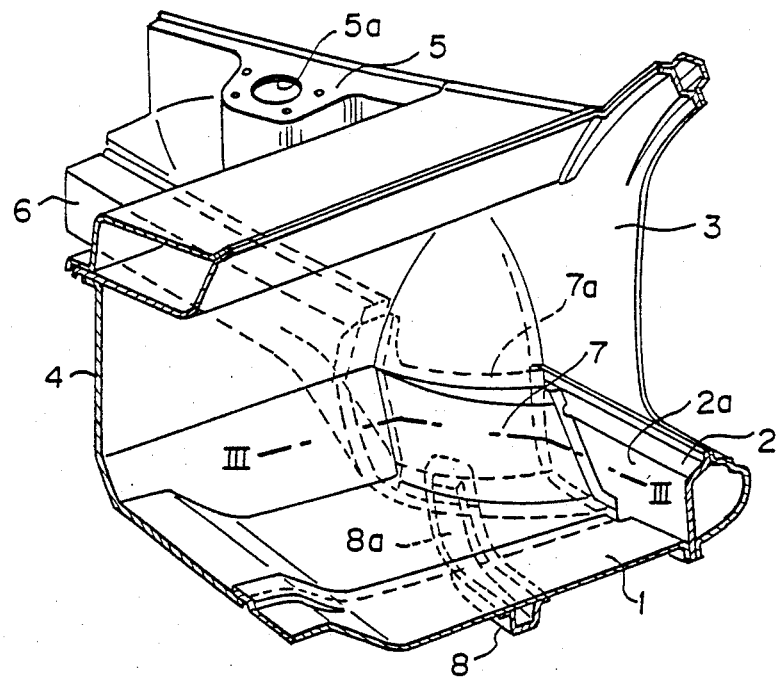
FIG. 1 is a perspective view showing an underbody structure in accordance with an embodiment of the present invention.
Figure 2:
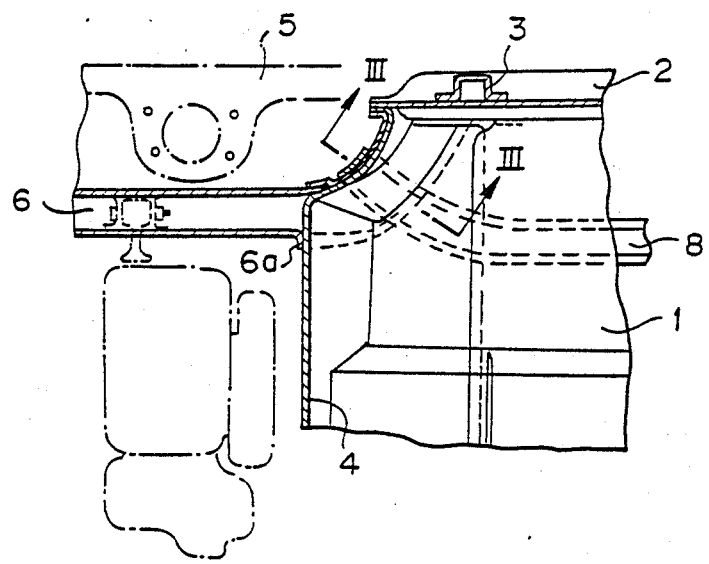
FIG. 2 is a plan view of the underbody structure.
Figure 3:
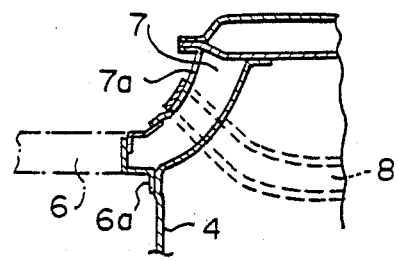
FIG. 3 is a cross-sectional view taken along line III—III in FIG. 1.

In FIGS. 1 to 3, a floor panel 1 defines the floor of a passenger compartment. A side sill 2 having a closed cross section is connected to the outer side edge of the floor panel 1 to extend in the longitudinal direction of the vehicle body. The front end 2a of the side sill 2 abuts against the rear surface of a front wheel apron 5. A front pillar 3 is provided to vertically extend and the lower end of the front pillar 3 is connected to the front end 2a of the side sill 2. The front end of the floor panel 1 is connected to the lower end of a dashboard panel 4 which vertically extends to separate the passenger compartment from the engine room.

The front wheel apron 5 is formed in the wall portion defining the engine room and is provided with a suspension tower 5a. A front frame 6 having a closed cross section is connected to the inner side surface of the front wheel apron 5 to extend in the longitudinal direction of the vehicle body. The rear end 6a of the front frame 6 abuts against the dashboard panel 4 and is connected thereto. Further, the rear end 6a of the front frame 6 is connected to the front end 2a of the side sill 2 by a torque box 7 extending along the front side of the dashboard panel 4 and having a closed cross section. To the lower surface of the floor panel 1 is connected a floor frame 8 to form a closed cross section together with the floor panel 1 on the inner side of the outer side edge at which the side sill 2 is connected to the floor panel 1. The front portion 8a of the floor frame 8 is bent outwardly along the lower surface of the floor panel 1 and connected to the torque box 7 substantially at the middle of the torque box 7.

Figure 4:
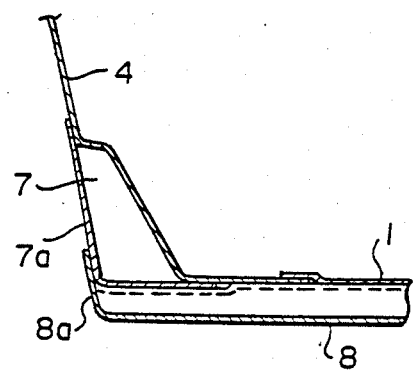
FIG. 4 is a cross-sectional view taken along line IV—IV in FIG. 2.

As clearly shown in FIG. 4, the torque box 7 is formed by connecting a torque box panel 7a to the lower end portion of the dashboard panel 4, and the front portion 8a of the floor panel 8 is connected to the lower surface of the torque box panel 7a. Further, as can be seen from FIG. 2, the torque box 7 is arcuately formed to conform to the shape of the front wheel apron 5 and the front portion 8a of the floor frame 8 is connected to the torque box 7 substantially at 90° relative thereto as viewed from above.

Figure 5A:
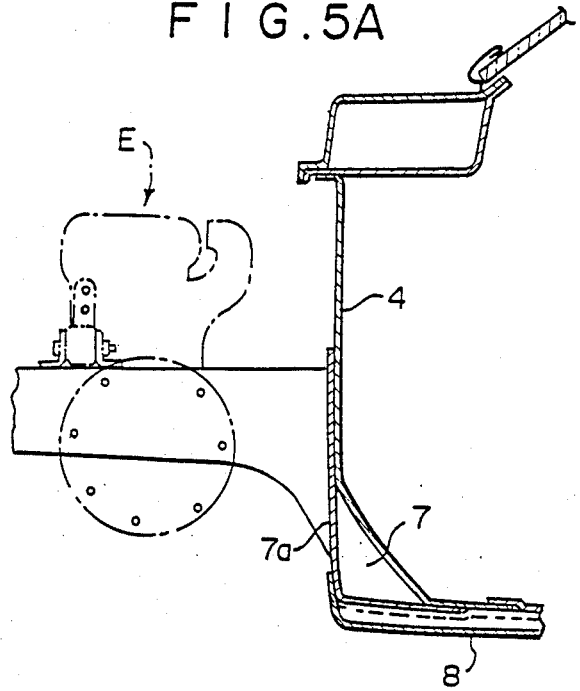
FIG. 5A is a view showing the condition of the underbody structure shown in FIG. 1 before collision.
Figure 5B:
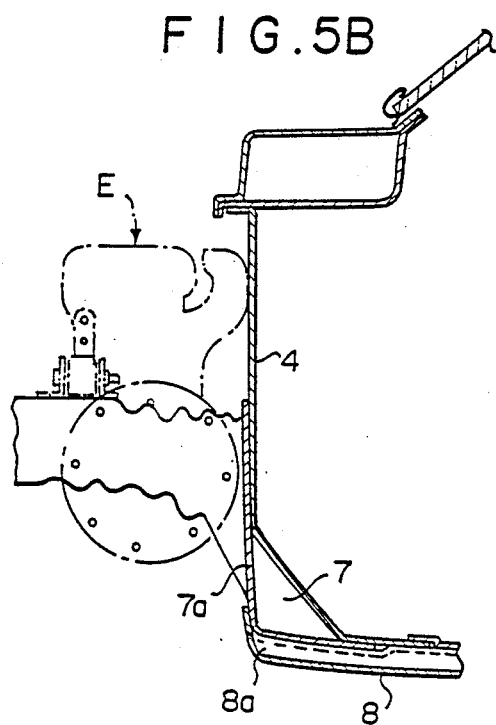
FIG. 5B is a view showing the condition of the same after collision.

FIGS. 5A and 5B are views for illustrating deformation of the vehicle body structure of this embodiment upon collision. As can be seen from FIGS. 5A and 5B, when the vehicle body collides, the front frame 6 is pushed rearward together with the engine E supported thereon. Since the rigidity of the torque box 7 to which the rear end 6a of the front frame 6 is connected is enhanced by the floor frame 8 connected thereto, the front frame 6 cannot be rotated upward about the junction to the torque box 7, and accordingly the front frame 6 is compressed as shown in FIG. 5B. Accordingly, the upper part of the vehicle body such as a windshield supporting mechanism cannot be deformed.

Figure 6:
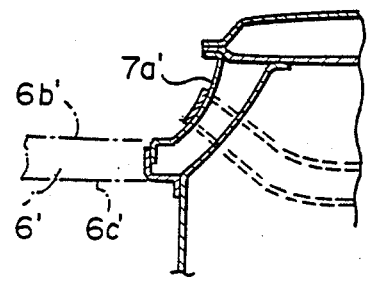
FIG. 6 is a view similar to FIG. 3 but showing a modification of the torque box panel.

In the embodiment described above, the torque box panel 7a for forming the torque box 7 together with the dashboard panel 4 is a member formed separately from the front frame 6. However, the torque box panel may be formed integrally with the front frame 6 as shown in FIG. 6. That is, in FIG. 6, the torque box panel 7a' is formed as a rearward extension of a front side frame outer 6b' which forms the front frame 6' together with the front side frame inner 6c'.

I claim:

1. An underbody structure for a vehicle comprising a front frame which has a closed cross section and is connected to a front wheel apron to extend in the longitudinal direction of the vehicle body, a side sill which has a closed cross section and extends along an outer side edge of a floor panel in the longitudinal direction of the vehicle body on the outer rear side of the front frame at a height lower than that of the front frame, a torque box having a torque box panel formed integrally with said front frame as a rearward extension of a part of said front frame and which extends along the rear surface of the front wheel apron and connects the rear end of the front frame and the front end of the side sill, and a floor frame which is connected to the lower surface of the floor panel on the inner side of the outer side edge of the floor panel to extend in the longitudinal direction of the vehicle body and the front edge of which is connected to an intermediate portion of the torque box.

2. An underbody structure as defined in claim 1 in which said floor frame is connected to the floor panel to form a closed cross section and the front end of the closed cross section is connected to the torque box.

3. An underbody structure as defined in claim 2 in which the front portion of the floor frame is bent outward so that the front end thereof is connected to the torque box substantially at 90° to the torque box.

4. An underbody structure as defined in claim 1 in which said torque box has a closed cross section formed by a dashboard panel and a torque box panel connected to the dashboard panel.

5. An underbody structure as defined in claim 4 in which said front frame comprises a side frame outer and a side frame inner, and said torque box panel is a rearward extension of the side frame outer.

6. An underbody structure as defined in claim 1 in which said torque box has an arcuate portion and said floor frame is connected to the middle of the arcuate portion.

7. An underbody structure for a vehicle comprising a front frame which has a closed cross section and is connected to a front wheel apron to extend in the longitudinal direction of the vehicle body, a side sill which has a closed cross section and extends along an outerside edge of a floor panel in the longitudinal direction of the vehicle body on the outer rear side of the front frame at a height lower than that of the front frame, a torque box having a closed cross section formed by a dashboard panel and a torque box panel connected to the dashboard panel with said torque box panel being formed integrally with said front frame as a rearward extension of a part of said front frame, and which extends along the rear surface of the front wheel apron and connects the rear end of the front frame and the front end of the side sill, and a floor frame which is connected to the lower surface of the floor panel on the inner side of the outer side edge of the floor panel to extend in the longitudinal direction of the vehicle body and the front edge of which is connected to the torque box.

8. An underbody structure for a vehicle comprising a front frame which has a closed cross section and is connected to a front wheel apron to extend in the longitudinal direction of the vehicle body, a side sill which has a closed cross section and extends along an outer side edge of a floor panel in the longitudinal direction of the vehicle body on the outer rear side of the front frame at a height lower than that of the front frame, a torque box which extends along the rear surface of the front wheel apron having a first end connected to the rear end of the front frame and a second end connected to the front end of the side sill, and a floor frame which is connected to the lower surface of the floor panel on the inner side of the outer side edge of the floor panel to extend in the longitudinal direction of the vehicle body and the front edge of which is connected to the torque box.

9. An underbody structure as defined in claim 8 in which said floor frame is connected to the floor panel to form a closed cross section and the front end of the closed cross section is connected to the torque box.

10. An underbody structure as defined in claim 9 in which the front portion of the floor frame is bent outward so that the front end thereof is connected to the torque box substantially at 90° to the torque box.

11. An underbody structure as defined in claim 8 in which said torque box has an arcuate portion and said floor frame is connected to the middle of the arcuate portion.

* * * * *